(No Model.)

D. BROOKS.
UNDERGROUND ELECTRICAL CONDUCTOR.

No. 325,495. Patented Sept. 1, 1885.

Witnesses.
John E. Parker
James F. Tobin

Inventor
David Brooks,
by his attorneys,
Howson & Son

UNITED STATES PATENT OFFICE.

DAVID BROOKS, OF PHILADELPHIA, PENNSYLVANIA.

UNDERGROUND ELECTRICAL CONDUCTOR.

SPECIFICATION forming part of Letters Patent No. 325,495, dated September 1, 1885.

Application filed June 3, 1885. (No model.)

*To all whom it may concern:*

Be it known that I, DAVID BROOKS, a citizen of the United States, residing in Philadelphia, Pennsylvania, have invented certain Improvements in Underground Electrical Conductors, of which the following is a specification.

My invention consists of certain improvements in underground electrical systems, my improvements being more especially adapted for use in connection with underground electrical conducting-cables for which I have obtained Letters Patent No. 210,986, dated December 17, 1878.

My present invention relates more particularly to a coupling device for carrying service-wires from the main cable, as fully described and claimed hereinafter.

Figure 1:
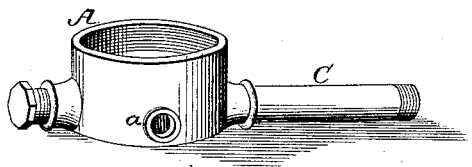
Figure 3:
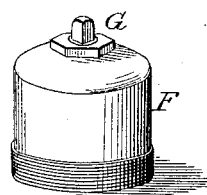
Figure 2:
Figures 4, 5:
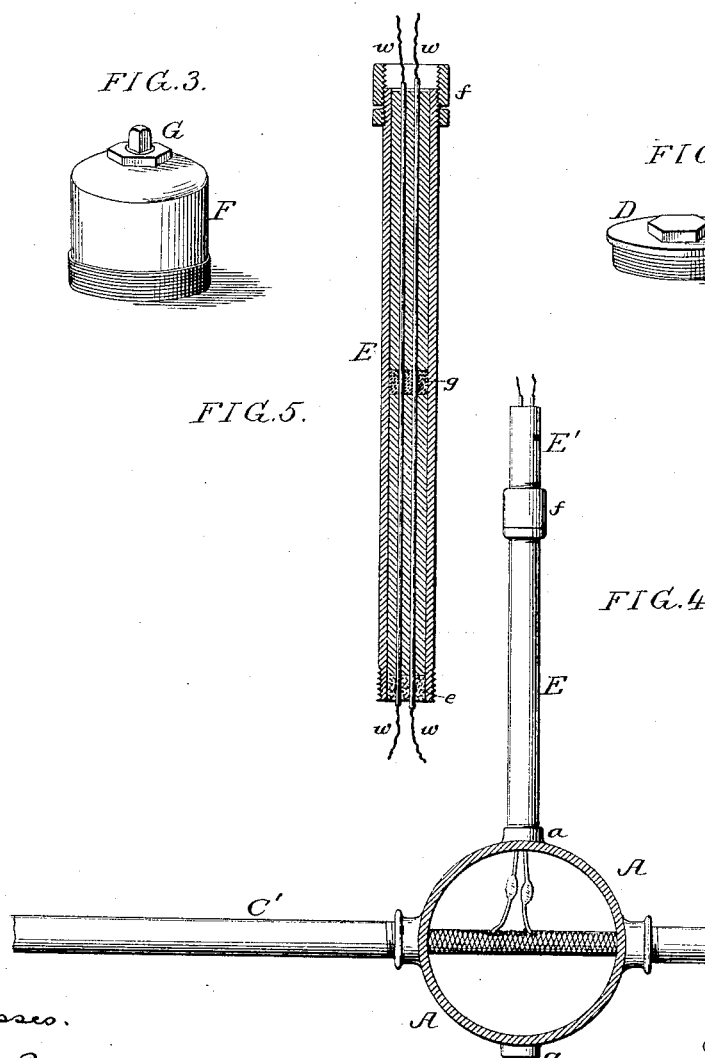

In the accompanying drawings, Figure 1 is a perspective view of a junction-box. Fig. 2 is a view of a closing-plug. Fig. 3 is a view of a inclosing cover or dome. Fig. 4 is a sectional plan view, and Fig. 5 is an enlarged sectional view, of my improved junction pipe or coupling.

The main feature of my patented system consists in running clothed wires through pipes or tubes filled with an insulating-liquid, and in the drawings C C' represent portions of the main conduit-pipe through which the main cable runs, while A represents a splice-box or junction-box provided with one or more outlet-sockets, $a$, into which tubes may be screwed to carry out service-wires at different points along the line of the cable.

The top of the box A may be closed by a screw-plug, D, Fig. 2, or, if the box contains spliced wires, a dome, F, may be employed, Fig. 3. The latter is provided with a plug, G, for pouring insulating-liquid into the box after a splice has been made.

In carrying out service-wires from a cable to points along the line or at the end of it it is important to prevent the escape or leakage of the insulating-liquid from the main conduit into the branch piping. For this purpose I provide a special coupling, which I will now proceed to describe, and which is illustrated more fully in Fig. 5.

A suitable length, E, of pipe of a size adapted to be screwed into one of the sockets, $a$, of the junction-box is provided, and in the pipe or tube are laid as many wires, $w$, as there are conductors to be carried out from the main cable at that point, two being shown in the drawings. These coupling-wires are somewhat longer than the tube, in order to permit splicing at each end. Cotton or other suitable material, $e$, is then placed in the end of the tube around the wires and the tube turned to an upright or nearly upright position. Plaster-of-paris in a powdered form is then poured into the tube to make a layer of, say, an inch or so, to form, with the fibrous material, a closure at the bottom of the tube. Into the tube thus closed is then poured liquid plaster-of-paris to fill up the tube to nearly half its length around the wires, which are held somewhere near the center of the tube. I then pour into the tube around the wires liquid glue and molasses, or printers' roller composition, or equivalent thick liquid or jelly-like material, which will form an impervious diaphragm, $g$, to the passage of the oil or other insulating-liquid. This impervious material is poured in to the depth of an inch or two, and over it is then poured liquid plaster-of-paris to fill up the tube or thereabout. The electrical coupling thus formed is then adapted to be screwed into a socket, $a$, on the junction-box A after removing the usual screw-plug from the socket, and the two wires $w$ which pass into the box are ready to be spliced up with the corresponding wires from the cable itself, while to the other ends of the wires may be spliced electrical conductors leading to the lamp or other instrument to which the current is to be supplied. This end of the tube E is provided with a coupling, $f$, for uniting it with piping E', carrying the clothed wires to the lamp or other instrument.

The tube E and its contents, as illustrated in Fig. 5, constitute an electrical coupling which can be kept ready for use at any time, and the layer $g$ of glue and molasses or printers' roller composition or equivalent impervious material forms a packing or diaphragm which effectually prevents the passage of the oil or other insulating-liquid from the junction to the piping E', while the plaster-of-paris on each side forms an effectual support or backing for the diaphragm, $g$.

I do not wish to limit myself to plaster-of-paris, as a cement or any equivalent material which will have the effect of forming a support for the diaphragm or packing $g$ and is not soluble in oil, will answer the purpose.

I claim as my invention—

1. The combination of the main conduit-pipe and junction-box containing a cable and liquid insulating material with a tube containing wires, and a diaphragm of glue and molasses or similar impervious material, and a supporting medium on each side thereof.

2. The herein-described electrical coupling, consisting of a tube containing electrical conductors and having a central diaphragm of glue and molasses or similar impervious material, and a support on each side thereof within the tube.

3. The combination of the main conduit piping and junction-box with a coupling-tube containing electrical conductors in plaster-of-paris, and a diaphragm of glue and molasses or printers' roller composition between the plaster, substantially as described.

In testimony whereof I have signed my name to this specification in the presence of two subscribing witnesses.

DAVID BROOKS.

Witnesses:
E. A. HAPPERSETT,
HARRY SMITH.